INVENTOR.
KIYOSHI W. MIDO
By
Miketta, Glenny, Poms & Smith
ATTORNEYS.

Jan. 21, 1969  K. W. MIDO  3,422,801
ROTARY COMBUSTION ENGINES
Filed Nov. 15, 1965

INVENTOR.
KIYOSHI W. MIDO
By
Mikette, Glenny, Poms & Smith
ATTORNEYS.

United States Patent Office 3,422,801
Patented Jan. 21, 1969

3,422,801
ROTARY COMBUSTION ENGINES
Kiyoshi W. Mido, 4849 La Rica Ave.,
Baldwin Park, Calif. 91706
Filed Nov. 15, 1965, Ser. No. 507,946
U.S. Cl. 123—14
Int. Cl. F02b 53/10, 55/10
4 Claims

ABSTRACT OF THE DISCLOSURE

A simplified rotary combustion engine employing a lobed rotor in a stationary cylinder provided with inwardly biased vanes. One end wall is provided with an arcuate compression port spaced from an arcuate expansion port and at a different radius from the rotor axis, both being in communication with a common ignition chamber or manifold external to the cylinder. The rotor is provided with passage means connecting chambers forward and rearward of the lobe with the ignition chamber through said compression and expansion ports during successive portions of a cycle of rotation.

My invention relates to a rotary combustion engine burning gasoline, diesel oil and the like. The primary objective of my invention is to provide an efficient engine wherein the pressure of burning gas is imparted to a rotor travelling in a continuous direction. The second objective of the invention is to provide a compact engine having a large power-per-pound ratio. The third objective is to provide a simple rotary engine having a small number of simple easy-to-make parts for economical manufacturing and also inexpensive maintenance. The fourth and final objective is to provide an engine that is easy to keep free of vibration.

The novel construction described hereinafter gives rise to a new mode of operation wherein a fuel-air mixture is compressed by the rotor and supplied through a compression port in the rotor to a manifold located externally of the cylinder in which the rotor revolves. This compressed fuel is ignited periodically in such manifold or ignition chamber and delivered through an expansion port extending through the rotor to an expansion chamber to cause rotation of the rotor. In this way, a two-lobed rotor cooperating with two pressure vanes biased against the rotor gives rise to two power and expansion cycles during each rotation of the rotor.

The novel elements of construction and cooperation of such elements in the rotary combustion engine will be described hereinafter with reference to the following drawings wherein.

Figure 1:
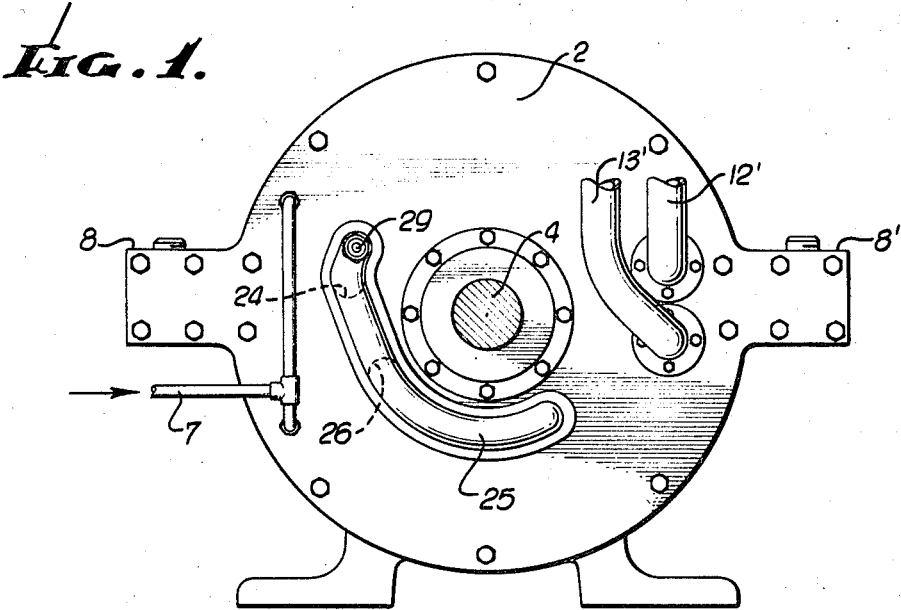
FIG. 1 is a rear elevation, partly diagrammatic, of a rotary combustion engine embodying my invention.
Figure 2:
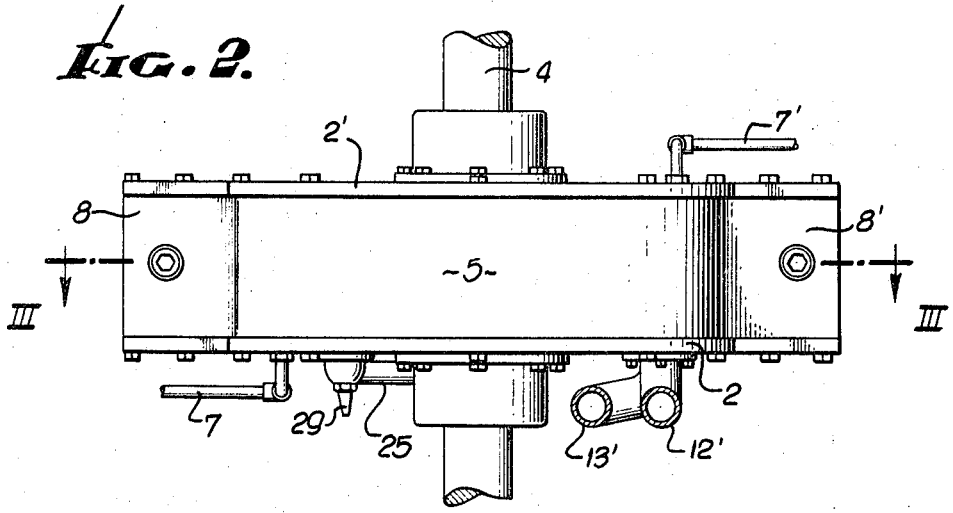
FIG. 2 is a plan view.

My new and improved rotary combustion engine consists of an engine block, a rotor assembly, and pressure plate assemblies.

As shown in somewhat diagrammatic and simplified form in the drawings, the engine block comprises a cylinder having a wall of uniform internal diameter indicated at 1, end plates or heads 2, 2' for the said cylinder, said end plates being provided with bearing boxes adapted to receive and rotatably support a shaft 4 on which there is mounted a lobed rotor 20 described more specifically hereafter. The cylinder 1 may be enclosed in a housing 5 to provide coolant spaces 6 and 6' around the cylinder, a coolant such as water being provided by inlet and outlet pipes 7 and 7'. The entire engine block is provided with a suitable base.

The engine block also carries pressure plate assemblies, equal in number to the number of lobes on the rotor. In the illustrated form, two such assemblies are indicated, each including a housing portion 8 for oil and a pressure plate or vane 10 biased inwardly as by springs 9 through suitable ports in cylinder 1 so as to place the forward or inward edge of the pressure plate in sliding contact with the external surface of the rotor 20 in every position of rotation of such rotor. In the form illustrated, the forward edge of the pressure plate is shown provided with a semicylindrical recess containing a contact roller bearing mounted for free rotation in such recess. Each of the housing portions 8 is provided with a top oil filling aperture provided with a closure and each pressure plate or vane is preferably provided with an oil channel 11 for constantly supplying oil from the housing to the contact roller bearing.

It is to be understood that the lobes of rotor 20 and its sides are in sliding contact with the inner wall of the cylinder 1 and with the end plates or heads 2 and 2'. The lobe portions of the rotor (indicated at A and B) in cooperation with the inner cylinder wall and the pressure vanes 10 and 10' in cooperation with the outer surface of the rotor, form chambers within the engine varying in volume in accordance with the rotational position of the rotor with respect to the pressure vanes. The rotor may have more than two lobes.

Figure 3:
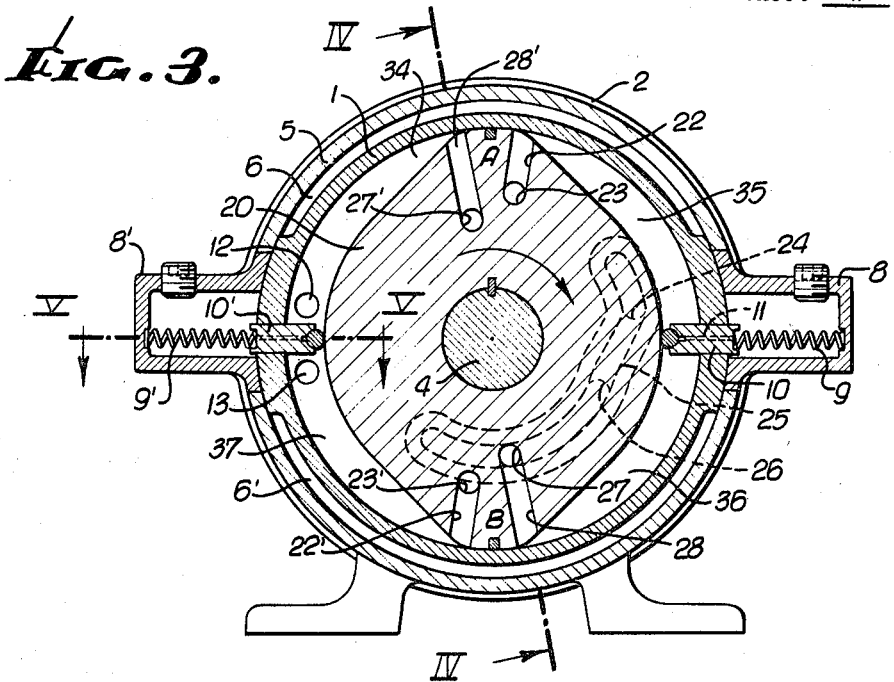
FIG. 3 is a vertical section taken along plane III—III through FIG. 2.
Figure 5:
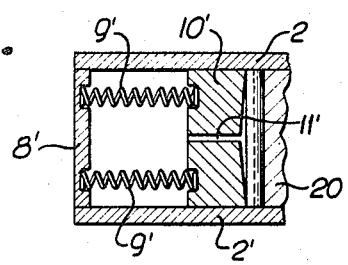
FIG. 5 is a fragmentary horizontal section taken along the plane V—V in FIG. 3.
Figure 4:
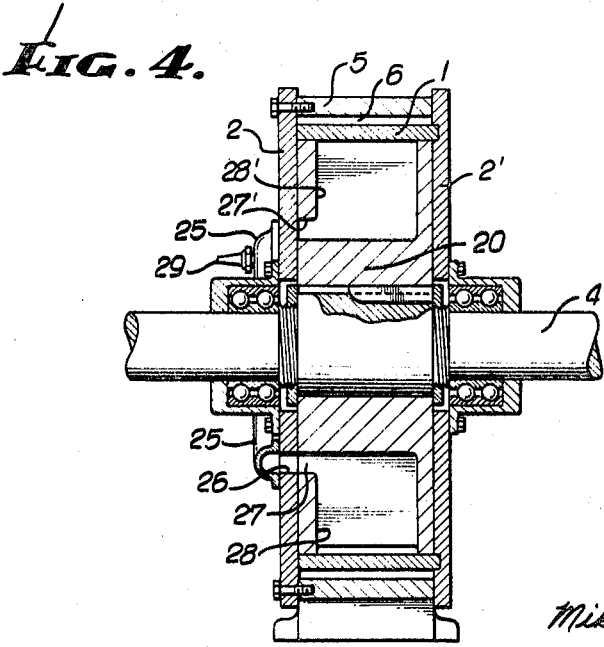
FIG. 4 is an axial section through the engine along plane IV—IV indicated in FIG. 3.

The end plate or cylinder head 2 is provided with an intake port 12 and an exhaust port 13 on opposite sides of a vane 10' as indicated in FIG. 3 and adjacent the internal wall of cylinder 1 so as to be in communication with chambers on opposite sides of the vane 10'. These two ports are connected respectively with an inlet pipe 12' which supplies an air-fuel mixture from a carburetor or similar source and an exhaust pipe 13' leading to a muffler or other outlet means.

The end plate or head 2 is also provided with an arcuate compression port 24 and an arcuate expansion port 26 (best seen in FIG. 3), these two ports being spaced from each other radially and angularly as best seen in FIG. 3. Both of these ports are normally sealed by the main body portion of the rotor (which acts as a valve), the compression port 24 being at a greater radial distance from the axis of the shaft 4, the latter being longer than the compression port. The end plate or head 2 carries a common manifold 25 which places the two ports 24 and 26 in communication with a common chamber formed by the manifold 25 externally of the engine. A spark plug or other ignition means 29 is carried by the manifold and extends into the chamber thus formed, preferably at a position near the beginning of compression port 24.

As shown in FIG. 3, the rotor 20 is arranged for rotation in the direction of the arrow and is provided with passage means extending from forward and rearward of a lobe (such as the lobe portions A and B), these passageways being arranged to communicate respectively with the compression port 24 and expansion port 26 at successive positions of rotation of the rotor and at different times only. These passageways therefore communicate with the chamber immediately forward of a lobe and with the chamber rearward of a lobe. As most clearly shown in FIG. 3, such passageway means forwardly of the lobe A include a radially and inwardly extending passageway portion 22 and an axially directed portion 23 which is at a distance from the axis of the shaft 4 so as to place the passageway portion 23 into communication with the compression port when the rotor has rotated to the right a sufficient angular distance. The passageway rearward of the lobe A includes a passageway portion 28' which extends radially inward a greater distance, and an axially directed passageway portion 27' which, although normally sealed by the end wall 2, will come into communication with the arcuate expansion port 26' upon adequate angular rotation of the rotor 20.

The operation of my rotary combustion engine will be readily apparent from the above description and a consideration of FIG. 3. In the position there illustrated, chamber 34 is drawing a fuel-air mixture through the supply port 12; chamber 35 between lobe portion A and vane 10 is undergoing compression of a fuel-air mixture previously drawn thereinto. It will be noted that gases in chamber 36 are expanding in a power portion of a cycle and chamber 36 is in communication with expansion port 26 through passageways 27 and 28, gases in manifold chamber 25 having been ignited by spark plug 29 and discharged through passageways 27, 28 into 36. Chamber 37 (between lobe B and pressure plate or vane 10') is being exhausted through exhaust port 13. When lobe portion A approaches vane 10, the passageway forward of lobe A, including 22 and 23, comes into communication with compression port 24 and the compressed fuel-air mixture is discharged into the external manifold and ignition chamber formed by 25.

When the lobe A reaches a rotational, substantially horizontal position, in contact with pressure vane 10, the lowermost chamber 37 completes the exhaust therefrom, expansion in chamber 36 is completed, intake of fuel into chamber 34 is terminated and compression in 35 is terminated. Upon a short further rotation of the rotor, the passageways formed in the rotor rearward of lobe A communicate with the expansion port 26 permitting the gases within the manifold chamber 25 (timely ignited by the spark means 29) to pass from the manifold chamber 25 through passageways 27' and 28' into the chamber between lobe A and vane 10, causing the pressure of these expanding gases to drive the rotor in a clockwise direction during an expansion stroke which takes place rearwardly of the lobe A. Concurrently, the forward portion of the lobe A now exhausts the lowermost chamber 37 into the discharge or exhaust port 13 and lobe B concurrently takes in air-fuel mixture which is admitted into the chamber rearwardly of lobe B through intake port 12, while the chamber forwardly of lobe B is again compressing fuel in chamber 35 against pressure vane 10. By following simultaneously all of the four chambers 34, 35, 36 and 37 throughout the cycle just described, it should be noted that all of the four cycles of a combustion engine are going on at any instant. Thus, in one complete rotation of the rotor, there are two power cycles. One unit of my rotary combustion engine is equivalent to a four cycle, four cylinder engine or a two cycle, two cylinder engine in terms of the number of power cycles per rotation of the rotor shaft.

A characteristic of the mode of operation obtained by the construction embraced by this invention is that the fuel-air mixture compressed in a chamber forwardly of a rotor lobe is forced into the external manifold 25, ignited therein and readmitted into a chamber rearwardly of the rotor lobe for power expansion. Although a two-lobed rotor has been described in the example given hereinabove, combustion engines employing the teachings of this invention may be employed with a larger number of lobes in a rotor.

All changes and modifications coming within the scope of the appended claims are embraced thereby.

I claim:

1. In a rotary combustion engine including a cylinder having a wall of uniform internal diameter, end plates for said cylinder and a rotor rotatably mounted on a shaft extending through said end plates, said rotor having two lobe portions in sliding contact with the inner wall of the cylinder and forming chambers in the cylinder, said cylinder wall being provided with a pair of opposed inwardly biased pressure vanes adapted to maintain contact with the rotor and form chambers in the cylinder therewith, the provision of:

a fuel supply port and an exhaust port in communication with the cylinder, said ports being adjacent opposite sides of a vane;

an arcuate compression port and an arcuate expansion port provided in an end plate of the cylinder, said ports being at different radial distances from the rotor shaft and normally sealed by the rotor;

a common manifold carried by the end plate externally of the cylinder connecting said compression and expansion ports;

passageway means formed in the rotor adjacent the forward side of each lobe for admitting a compressed fuel mixture from a chamber forward of such lobe through the compression port into the manifold during a portion of a cycle of rotor rotation;

and passageway means formed in the rotor adjacent the rear side of each lobe for admitting ignited fuel gases from the manifold and expansion port into the chamber rearward of such lobe during another portion of a cycle of rotor rotation.

2. A rotary combustion engine as stated in claim 1 wherein each of said passageway means includes a radially and inwardly extending passageway portion and an axially directed portion adapted to communicate with the desired compression or expansion port, said axially directed portions being at different radial distances from the rotor shaft axis; and ignition means in said common manifold.

3. In a rotary combustion engine including a stationary cylinder provided with end walls, a rotatably mounted shaft extending through said end walls, a lobed rotor mounted on said shaft in sliding contact with the cylinder and its end walls, and inwardly biased pressure vanes cooperating with the rotor, the provision of:

an arcuate compression port and an arcuate expansion port formed in an end wall of the engine, said ports being spaced from each other radially and angularly and normally sealed by a rotor;

a common external manifold chamber in communication with both said ports, said chamber being provided with ignition means;

said rotor being provided with passage means extending from forward and rearward of a lobe thereof and arranged to communicate respectively with said compression and expansion ports at successive positions of rotation of said rotor.

4. A rotor for a rotary combustion engine including a cylinder having a wall of uniform internal diameter, said rotor being adapted for mounting on a shaft and being provided with at least one lobe, such lobe having a section adapted to slidingly contact the cylinder wall, the lobe having a forward side and a rearward side;

passageway means formed in the rotor adjacent the forward side of the lobe for conducting gases from a zone forward of the lobe, radially inward and then axially outward and out of said rotor;

and radially extending passageway means formed in the rotor adjacent the rear side of the lobe for conducting gases into a zone rearward of the lobe from a source external to said rotor.

References Cited

UNITED STATES PATENTS 1,280,915   10/1918   Weidenbach _____ 123—14

FOREIGN PATENTS 555,223   8/1943   Great Britain.
1,335,918   7/1963   France.

WENDELL E. BURNS, *Primary Examiner.*

U.S. Cl. X.R.

123—8